US008081088B2

(12) United States Patent
Clausner et al.

(10) Patent No.: US 8,081,088 B2
(45) Date of Patent: Dec. 20, 2011

(54) METHOD AND APPARATUS FOR APPORTIONING ATTENTION TO STATUS INDICATORS

(75) Inventors: Timothy C. Clausner, Silver Spring, MD (US); Ronald T. Azuma, Santa Monica, CA (US)

(73) Assignee: Raytheon Company, Waltham, MA (US)

( * ) Notice: Subject to any disclaimer, the term of this patent is extended or adjusted under 35 U.S.C. 154(b) by 540 days.

(21) Appl. No.: 12/208,694

(22) Filed: Sep. 11, 2008

(65) Prior Publication Data

US 2010/0060447 A1 Mar. 11, 2010

(51) Int. Cl.
*G08B 21/00* (2006.01)

(52) U.S. Cl. ........ 340/945; 340/525; 340/438; 340/461; 701/3

(58) Field of Classification Search .................. 340/540, 340/438, 461, 459, 525, 945; 701/3, 29, 701/34, 99; 434/118
See application file for complete search history.

(56) References Cited

U.S. PATENT DOCUMENTS

| | | | |
|---|---|---|---|
| 4,379,331 A | 4/1983 | Watson | |
| 6,356,812 B1 * | 3/2002 | Cragun | 701/1 |
| 6,433,679 B1 * | 8/2002 | Schmid | 340/435 |
| 6,441,726 B1 | 8/2002 | Voto et al. | |
| 6,445,969 B1 | 9/2002 | Kenney et al. | |
| 6,527,556 B1 | 3/2003 | Koskinen | |
| 6,591,157 B1 | 7/2003 | Vivirito et al. | |
| 6,772,046 B1 | 8/2004 | Lee et al. | |
| 6,978,115 B2 | 12/2005 | Whitehurst et al. | |
| 7,110,924 B2 | 9/2006 | Prewett et al. | |
| 7,146,257 B2 | 12/2006 | Tanaka et al. | |
| 7,206,643 B2 | 4/2007 | Ruutu et al. | |
| 7,213,174 B2 | 5/2007 | Dahlquist et al. | |
| 2005/0196730 A1 | 9/2005 | Kellman | |
| 2006/0255956 A1 * | 11/2006 | Arakawa et al. | 340/576 |

OTHER PUBLICATIONS

Muir et al., Trust in automation, Part II: Experimental studies of trust and human intervention in a process control simulation. *Ergonomics*, 1996, 39 (3), pp. 429-460.
Moray et al., Trust, self-confidence, and operators' adaptation to automation. *International Journal of Human Computer Studies*, 1994, 40 (1), pp. 153-184.
Dzindolet et al., The role of trust in automation reliance. *International Journal of Human-Computer Studies*, 2003, 58 (6), pp. 697-718.
Muir, Trust between humans and machines, and the design of decision aids. *International Journal of Man-Machine Studies*. 1987, 27 (5-6), pp. 527-539.
Masalonis et al., Trust as a construct for evaluation of automated aids—Past and future theory and research. *Proceedings of the Human Factors and Ergonomics Society 43$^{rd}$ Annual Meeting*, 1999, pp. 184-188.
Parasuraman et al., A model for types and levels of human interaction with automation. *IEEE Transactions on systems, Man, and Cybernetics—Part A: Systems and Humans*, vol. 30, No. 3, May 2000, pp. 286-297.

* cited by examiner

*Primary Examiner* — Jennifer Mehmood
*Assistant Examiner* — Hongmin Fan
(74) *Attorney, Agent, or Firm* — Daly, Crowley, Mofford & Durkee, LLP (57) ABSTRACT

Methods and apparatus for generating, by a computer processor, a first status indicator and a second status indicator, generating a first attention value to indicate an amount of attention a user should devote to the first status indicator, and a second attention value to indicate an amount of attention the user should devote to the second status indicator, and outputting the first and second attention values to enable display for the user. The attention values may be generated based on reliability factors of the status indicators and on probability of failure of a control system.

21 Claims, 6 Drawing Sheets

METHOD AND APPARATUS FOR APPORTIONING ATTENTION TO STATUS INDICATORS

BACKGROUND

Many conventional control systems include automation control, such as automated landing of individual or linked formations of aircraft, automated control of nuclear power plants, automated piloting of ship navigational systems, etc. Automation control is generally reliable but not infallible, as there is always the chance of one or more automation control failures due to unforeseen or unusual circumstances, hardware failures, communication link failures, sensor failures, etc. Since the cost of failure is unacceptably high, conventional control systems include human operators as the ultimate backup to ensure safe operation. In certain events, for example, when the automation control system fails, the human operator can take manual control to ensure safe operation of the control system.

Conventional control systems often assume that the human operator is not attentive and must have the human operator's attention directed to potential failures by sounding obvious alerts (alarms, flashing lights, etc.) when the control system detects a potential failure. This potential failure may be computed using various conventional methods, such as statistical models to determine when to sound such alerts, given the probability of failure and operating conditions. These conventional control methods for sounding alerts have many problems because quite often the statistical models must be sensitive enough to detect potential failures, however, such sensitivity can produce frequent false alerts. Such frequent false alerts can condition human operators to delay response to a failure while they determine on their own whether a failure has in fact occurred. Such delays can have detrimental consequences when a control system failure requires the human operator's immediate attention and/or corrective input.

SUMMARY

In accordance with an embodiment of the invention, an article includes a storage medium having stored instructions that when executed by a machine result in generating a first status indicator and a second status indicator, generating a first attention value to indicate an amount of attention a user should devote to the first status indicator and a second attention value to indicate an amount of attention the user should devote to the second status indicator, and outputting the first and second attention values to enable display for the user. In further embodiments, the article can include one or more of the following features: the status indicators are associated with a reliability factor and a probability of failure and generating the attention values is based on a function of the reliability factor and the probability of failure; outputting the first and second attention values includes displaying the first attention value on a first display and displaying the second attention value on a second display; generating a first actual attention value representing the actual attention the user devotes to the first status indicator and a second actual attention value representing the actual attention the user devotes to the second status indicator, generating a first difference value representing the difference between the first attention value and the first actual attention value for the first status indicator and a second difference value representing the difference between the second attention value and the second actual attention value for the second status indicator, and outputting the first and second actual attention values and the first and second difference values to enable display to a user; and the first status indicator comprises a plurality of status indicators, and the first attention value comprises a plurality of attention values to indicate an amount of attention the user should devote to the plurality of status indicators.

In another aspect, an embodiment of the invention includes a method including generating, by a computer processor, a first status indicator and a second status indicator, generating a first attention value to indicate an amount of attention a user should devote to the first status indicator, and a second attention value to indicate an amount of attention the user should devote to the second status indicator, and outputting the first and second attention values to enable display for the user.

It should be noted that one or more of the method steps may be executed on a first and second computer processor, for example, a first and a second processor of a dual core processor chip. One of the processors may be configured to generate the status indicators and the other one of the processors may be configured to generate the attention values.

In further embodiments, the method can include one or more of the following features: each of the status indicators is associated with a reliability factor and a probability of failure and generating the attention values is based on a function of the reliability factor and the probability of failure; outputting the first and second attention values comprises displaying the first attention value on a first display and displaying the second attention value on a second display; further generating a first actual attention value representing the actual attention the user devotes to the first status indicator and a second actual attention value representing the actual attention the user devotes to the second status indicator, generating a first difference value representing the difference between the first attention value and the first actual attention value for the first status indicator and a second difference value representing the difference between the second attention value and the second actual attention value for the second status indicator, and outputting the first and second actual attention values and the first and second difference values to enable display to a user; and wherein the first status indicator includes a plurality of status indicators, and the first attention value includes a plurality of attention values to indicate an amount of attention the user should devote to the plurality of status indicators.

In a further aspect, an embodiment of the invention includes a system including a storage medium having stored instructions that when executed by a machine result in the following: a status indicator module to generate a first status indicator and a second status indicator, an attention apportioning module to generate a first attention value indicating an amount of attention a user should devote to the first status indicator and a second attention value indicating an amount of attention the user should devote to the second status indicator, and an output module to output the first and second attention values to enable display for the user.

In further embodiments, the system can include one or more of the following features: each of the status indicators is associated with a reliability factor and a probability of failure and the attention apportioning module generates the attention values based on a function of the reliability factor and the probability of failure; the first attention value is displayed on a first display and the second attention value is displayed on a second display; a tracker module to generate a first actual attention value representing the actual attention the user devotes to the first status indicator and a second actual attention value representing the actual attention the user devotes to the second status indicator, a training module to generate a first difference value representing the difference between the first attention value and the first actual attention value for the first status indicator and a second difference value representing the difference between the second attention value and the second actual attention value for the second status indicator, and wherein the output module further outputs the first and second actual attention values and the first and second difference values to enable display to the user; and the first status indicator includes a plurality of status indicators and the first attention value includes a plurality of attention values to indicate an amount of attention the user should devote to the plurality of status indicators.

BRIEF DESCRIPTION OF THE DRAWINGS

The foregoing features of this invention, as well as the invention itself, may be more fully understood from the following description of the drawings in which.

DETAILED DESCRIPTION

The inventive systems, methods, and techniques described herein use status indicators associated with the state of a control system to signal the possible need for user intervention. A user attends to the status indicators in a manner consistent with the conditional probability that a status indicator is a reliable precondition for an automation control failure. For example, the user may devote more attention to monitoring status indicators that are more likely to indicate automation control failures. As a result, the user can become more actively engaged in the monitoring task and can respond quickly and reliably to actual automation control failures.

In contrast, many conventional control systems use statistical models to determine when to alert users to potential control failures. The statistical models may need to be sensitive enough to compute and detect potential automation control failures; however, the required level of sensitivity may result in frequent false alerts. Human operators who experience such frequent false alerts may become inattentive and unresponsive to system alerts, especially if past experience with the control system indicates that actual automation control failures are rare. Pilots of military aircraft, for example, may be trained to instantly respond to an alert sounded by a Ground Proximity Warning System (GPWS). However, if the GPWS produces frequent false alerts, pilots may become desensitized to the alerts and may lose trust in the GPWS, and may delay immediate corrective actions to alerts while they confirm on their own whether a failure has actually occurred. Such delay can add tens of seconds to reaction times and may have serious consequences, especially when pilot response time to the failure is critical.

The inventive systems, techniques, and concepts described herein may be incorporated into a variety of control systems, including, but not limited to power generation, air traffic control, military craft control, and process control systems for manufacturing and production. A portion of these systems may incorporate automation controls to maintain proper system functioning, for example, nuclear power plant operations may include automation controls to activate back-up systems in case of an emergency.

Figure 1:
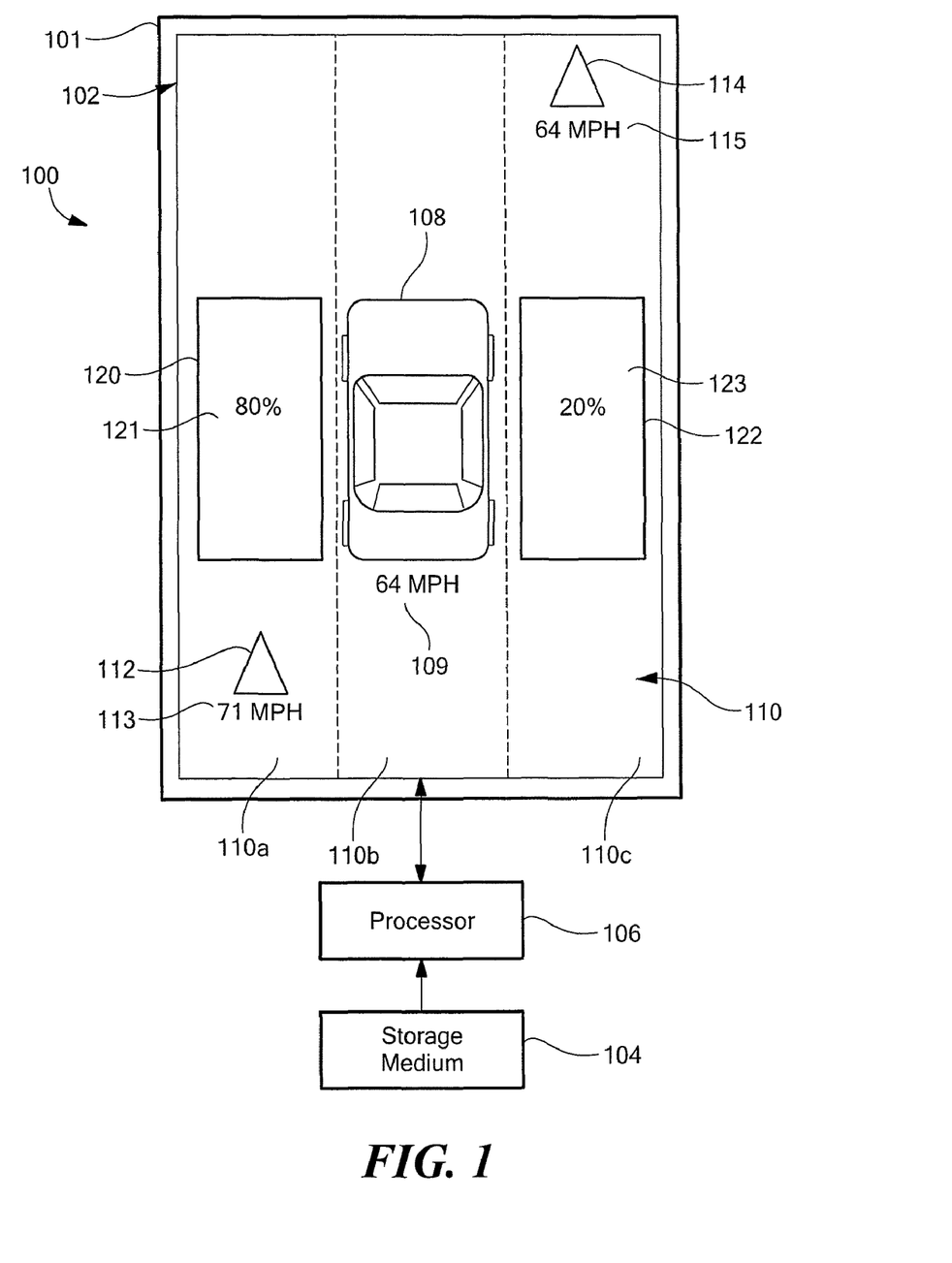
FIG. 1 is a pictorial diagram of an exemplary control system incorporating the inventive systems, techniques, and concepts.

Referring to FIG. 1, an automobile control system 100 incorporating the inventive systems and techniques described herein is for assisting drivers in the operation of an automobile. The automobile control system 100 may include a variety of sensors to monitor automobile speed and road position, as well as locations of nearby automobiles, road debris, upcoming traffic signals, etc. In this example, the automobile control system 100 includes an advanced automatic drive system that can control the automobile's speed and position to avoid collisions with nearby automobiles, road debris, etc.

The automobile control system 100 includes a display 101, a storage medium 104 for storing instructions to perform functions of the automobile control system 100, and a processor 106 for executing the stored instructions. The display 101 includes a display screen 102 depicting the visual output of the automobile control system 100. The display screen 102 can depict a top view of the driver's automobile 108 driven on a three-lane highway 110. The display screen 102 can also depict automobiles driven in the vicinity of automobile 108, such as automobiles 112, 114 (represented as shaded triangles).

The driver must be aware of the automobile's current speed and position on the road to maintain safe driving conditions. For example, the driver must frequently peer out the windows and check rear-view and side-view mirrors to keep a watchful eye on the automobile's position and on nearby automobiles. In the exemplary system of FIG. 1, the driver is travelling in the middle lane 110b at a speed of 64 miles per hour (MPH), as indicated by a displayed speed 109. Further, the driver must be defensively aware of nearby automobiles on the road in order to maintain a safe distance from them. In this example, a first nearby automobile 112 (depicted by a triangle icon) is travelling in the left lane 110a at a speed of 71 MPH, as shown by displayed speed 113, and a second nearby automobile 114 is travelling in the right lane 110c at a speed of 64 MPH, as shown by displayed speed 115.

In this example, the automobile control system 100 detects the relative positions and speeds of the driver's automobile and nearby automobiles 112, 114 and determines an amount of attention the driver should devote to various locations outside the driver's automobile. For example, a driver may need to visually attend to an area left of the automobile, represented by box 120, and to an area right of the automobile, represented by box 122. Based on reliability data and current road conditions, the automobile control system 100 can determine the relative amounts of time the driver should devote to respective areas 120, 122. For example, the automobile control system 100 can determine that the driver should attend more to area 120 because automobile 112 is rapidly approaching from the rear-left, and especially because automobile 112 is in the driver's blind spot. In contrast, the automobile control system 100 can determine that the driver should attend less to area 122, because automobile 114 is maintaining a steady, known distance from the driver and is the driver's normal viewing direction. However, automobile 114 could suddenly and unexpectedly drop in speed and approach the driver's automobile and, therefore, the driver should devote some attention to area 122. Based on these relative factors, the automobile control system 100 can determine that the driver should spend 80% of the time attending to area 120, as indicated by displayed attention value 121, and 20% of the time attending to area 122, as indicated by displayed attention value 123. In this example, the automobile control system 100 determines and continuously updates the attention values based on constantly changing road conditions. However, it will be apparent that for relatively static information, the attention values could be generated and outputted a single time, and then used by a user to attend to the status indicators.

It will be apparent that the displayed amounts of attention do not indicate the total attention of the driver, as the driver will need to attend to other tasks, such as monitoring current speed, watching out for road debris, and even ensuring that a child passenger is securely seat-belted. Further, in this example, the attention values are normalized to a range of 0 to 100 and displayed as percentages. However, the attention values could be displayed in other ways, for example, as high, low, or medium values, and the display 102 could include colors to indicate warning conditions, etc. It will also be apparent that display 102 may include only the attention indicators 121, 123.

Exemplary techniques used to generate attention values based on status indicators will now be described in detail. An automation component of a control system may have a probability of failure p(f), indicating the probability that the automation component of a control system has failed or has reached an unsafe condition requiring user intervention. This value is typically very small. Further, the automation component of a control system can include multiple status indicators that represent important control system operating conditions. A user can monitor the multiple status indicators, and if one or more of the status indicators indicates an automation control failure, than the user can react, for example, by taking manual control of the system, or through other corrective actions. For example, a status indicator for line pressure in a power plant system may reach a threshold value indicating that an automation component of the power plant for maintaining proper pressure may be failing and, if so, the user can take control and manually relieve the line pressure by opening a relief valve in the system.

The status indicators may not be perfect indicators of automation control failure and different status indicators may have different characteristics in terms of how reliably they correctly indicate when the automation control has failed. For example, in the above example involving line pressure in a power plant system, the status indicator for line pressure may be calibrated to be very sensitive in order to detect small fluctuations that could be a precondition to system failures. Thus, the status indicator may indicate a small fluctuation in line pressure and may warn the user. However, such a fluctuation may merely indicate normal ebbs-and-flows in the line, and thus, the status indicator may not be a reliable indicator of a true line system failure.

A reliability factor, R, for a status indicator can be generated using a combination of the status indicator's reliability in correctly indicating automation control failure and the overall probability of an automation control failure. Various mathematical formulas may be used to generate the reliability factor including, but not limited to, a form of Bayes' Theorem. Bayes' Theorem is useful for determining probabilities of events conditional on certain indicators. Equation 1 represents a Bayesian form to compute R:

$$R = P_S(F).\qquad\text{Equation 1}$$

Here, $P_S(F)$ represents the reliability of a status indicator, in other words, the probability that an automation control failure has occurred, F, given that the status indicator, S, indicates an automation control failure has occurred, $P_S$. $P_S(F)$ can be computed according to Equation 2:

$$P_S(F) = [P(F)*P_F(S)]/[P(F)*P_F(S) + P(\sim F)*P_{\sim F}(S)]\qquad\text{Equation 2}$$

In Equation 2, P(F) represents the probability of automation control failure and unsafe control system operation. P(~F) represents the probability of no automation control failure, or 1−P(F). The status indicator can be said to have a sensitivity and a specificity related to determining whether the control system has failed or not. The sensitivity is the fraction of times that the status indicator correctly indicates a failure of the system, or the "true positive" rate. The specificity is the fraction of time the status indicator correctly indicates no control system failure, or the "true negative" rate. In Equation 2, true positives are represented by the term $P_F(S)$, and true negatives are represented by term $P_{\sim F}(S)$. These values can be stated as a percentage, for example, the status indicator true positive rate can be 76%, meaning that the status indicator correctly indicates an automation failure 76 out of 100 times. However, 24 out of 100 times, the status indicator indicates an automation failure when none exists, or the "false positive" rate.

As an example, assume that the automation fails 2% of the time, the status indicator has a true positive rate of 90%, and a true negative rate of 80%. These values may be based on reliability data, such as test data from past system performance recording occurrences of true positives and true negatives. In another embodiment, these values may be based on statistical methods and models in which the status indicators are observed along with actual automation failure rates to arrive at estimations of reliability, such as mean squared error.

The above values can be stated as follows:

$$P(F) = 0.02, P(\sim F) = 0.98$$

$$P_F(S) = 0.90$$

$$P_{\sim F}(\sim S) = 0.80$$

$$P_{\sim F}(S) = 1.0 - 0.80 = 0.2$$

Calculating R in Equation 2 yields 0.02*0.90/[0.02*0.90+ 0.98*0.20], approximately 0.084.

The Bayesian form of the reliability factor for status indicator n may be generally represented by Equation 3:

$$R_n = P_n(F)\qquad\text{Equation 3}$$

Given first and second status indicators $S_1$ and $S_2$ for monitoring an automation component of a control system, with respective reliability factors $R_1$ and $R_2$, a portion of user attention to devote to each of the first and second status indicators $A_1$ and $A_2$ can now be computed according to Equations 4 and 5.

$$A_1 = R_1/[R_1 + R_2]\qquad\text{Equation 4}$$

$$A_2 = R_2/[R_1 + R_2]\qquad\text{Equation 5}$$

Further, the attention values can be multiplied by 100 to yield a relative percentage of attention to pay to each of the first and second status indicators. Thus, attention values for status indicators n in a system having status indicators n and n+1 may be generally represented in Equation 6 as follows:

$$A_n = (R_n/[R_n + R_{n+1}])*100\%\qquad\text{Equation 6}$$

Figure 2:
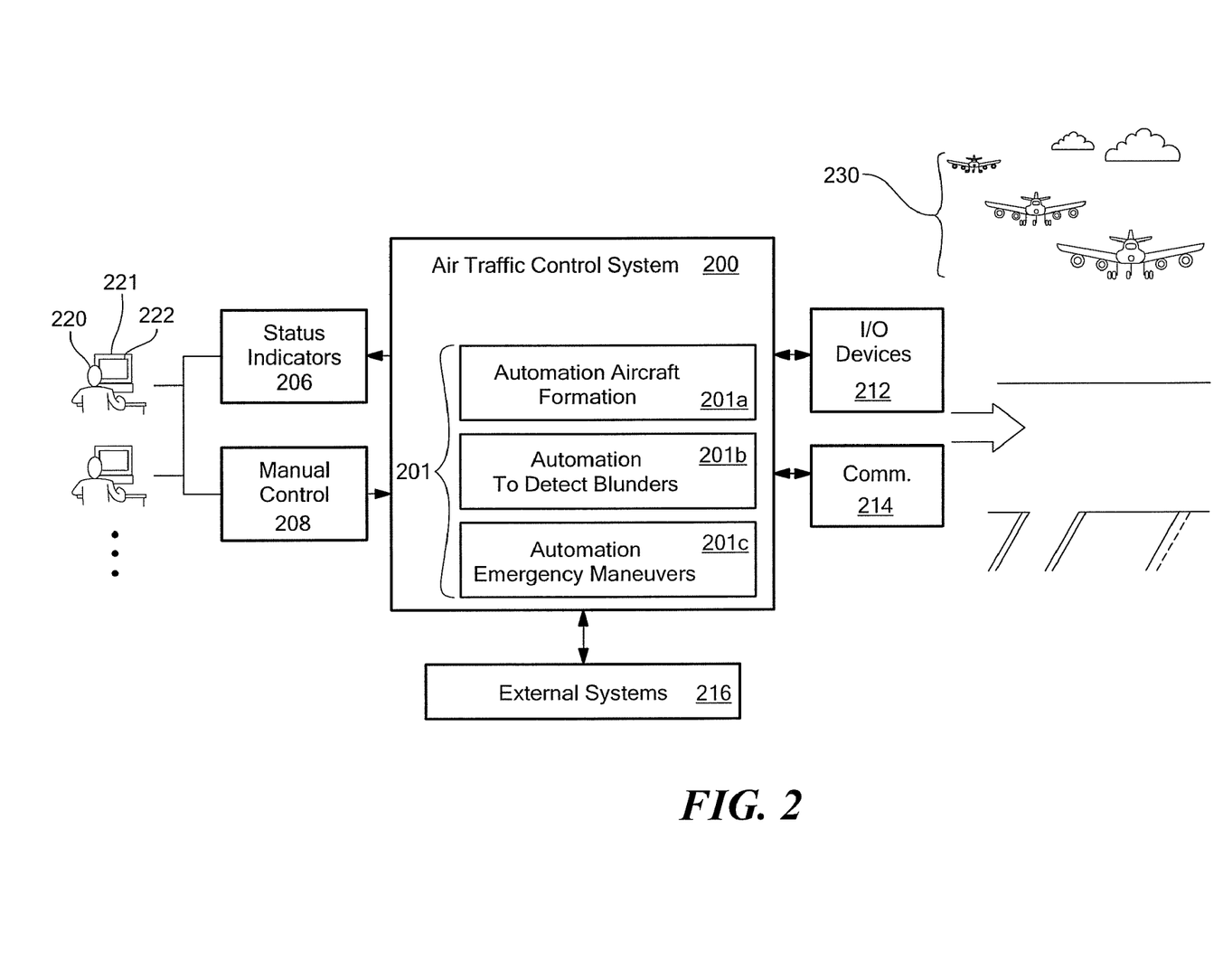
FIG. 2 is a pictorial diagram of another exemplary air traffic control system incorporating the inventive systems, techniques, and concepts.

Referring now to FIG. 2, in another example environment incorporating the inventive systems, methods, and concepts described herein, an air traffic control system 200 can include multiple automation control layers 201 to allow multiple commercial aircraft 230 to fly in close formation during final approach to very closely spaced runways for landing. The automation control layers 201 can be implemented as hardware modules including circuitry, as computer-readable modules stored on a computer-readable medium, or a combination thereof.

The multiple automation control layers 201 can include automation of aircraft in formation 201a, automation to detect blunders 201b, such as an aircraft veering out of formation, and automation to execute emergency escape maneuvers 201c. Each of the automation layers has a different level of reliability. The air traffic control system 200 may interface with I/O devices 212, such as sensors to detect aircraft speed, location, altitude, etc. and communications equipment 214, such as towers connected to weather forecasting systems. Further, the air traffic control system 200 may interface with external systems 216, such as airport operations and flight status systems.

The air traffic control system 200 generates status indicators 206 to indicate the state of the air traffic control system 200 and/or the automations 201. Air traffic controllers 220 may view one or more of the status indicator 206 on a display 221, including attention values 222 to indicate an amount of attention the air traffic controller 220 should devote to the one or more status indicators 206. The status indicators 206 may be directed toward an automation 201 of the air traffic control system 200. The automation to detect blunders, for example, can include a first status indicator $S_1$ to represent roll of aircraft in formation, and a second indicator $S_2$ to represent yaw of aircraft in formation.

In the air traffic control system 200, it may be that the roll is a more reliable indicator of automation failure than the yaw, in which case $R_1 > R_2$, where $R_1$ is the reliability factor of the roll, and $R_2$ is the reliability factor for the yaw. It may be, for example, that the yaw is susceptible to changing wind conditions and a slight nudge from side winds may produce noticeable changes in yaw. Therefore, a displayed variation in yaw in one of the aircraft may not indicate a failure in aircraft formation, but merely minor deviations caused by the wind. Here, failure means that the automation to maintain aircraft in formation has improperly caused one or more of the aircraft to fall out of formation. In contrast, the roll is a more reliable indicator of a failure in aircraft formation, and thus, a displayed variation in roll in one of the aircraft may indicate that formation is in fact failing and that the air traffic controller must take action.

Exemplary techniques to output generated attention values for the roll and yaw of the air traffic control system will now be described in detail. Given an example reliability factor for the roll equal to 0.33, and a reliability factor for the yaw equal to 0.22, Equation 6 can be used to generate an attention value for the roll equal to 60%, and an attention value for the yaw equal to 40%.

Figure 3:
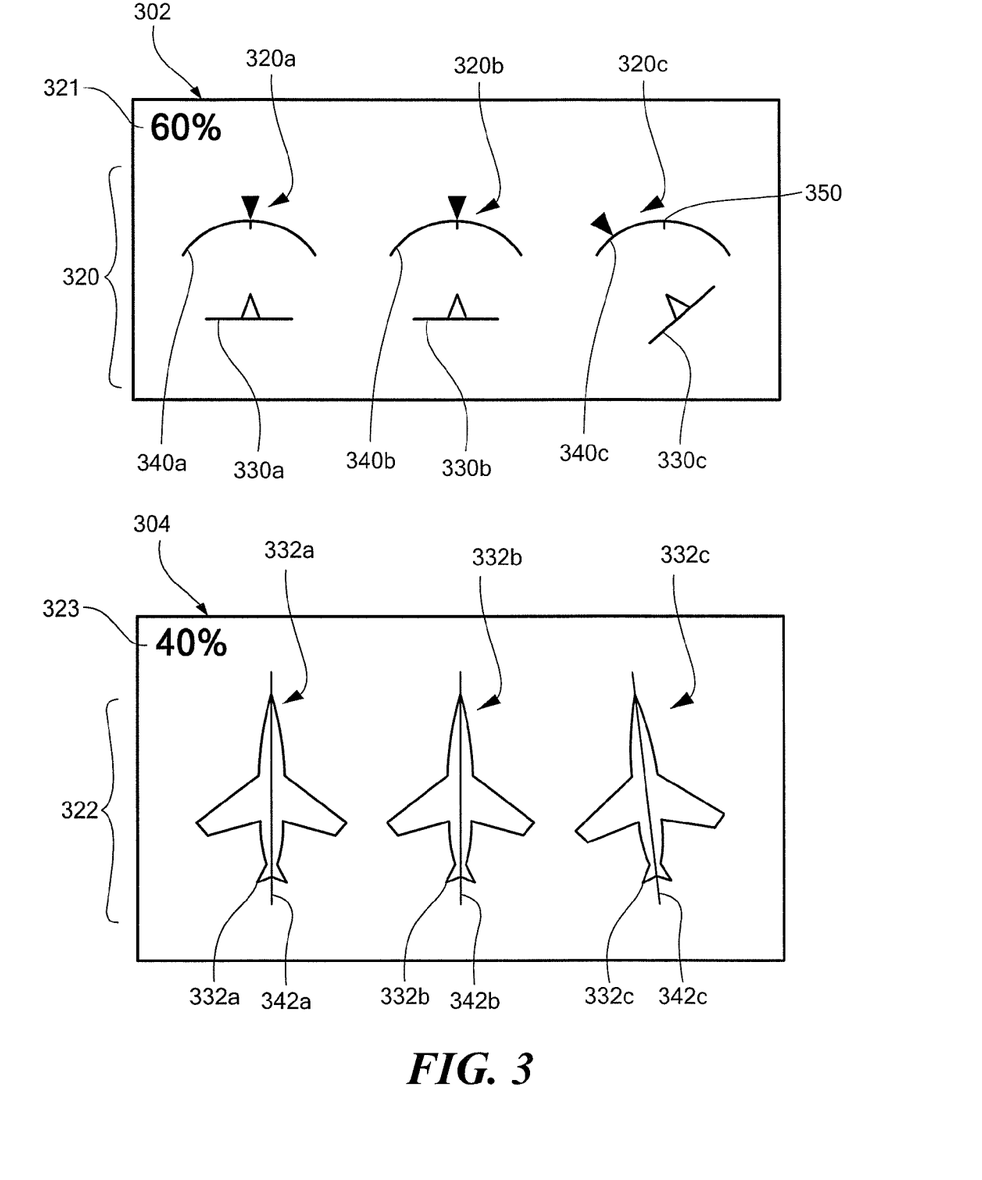
FIG. 3 is pictorial diagram of an exemplary embodiment of a display to output attention values associated with the air traffic control system in FIG. 2.

Referring now to FIG. 3, a first display 302 includes a first status indicator 320 for the roll of each aircraft in formation. Status indicators 320a, 320b, and 320c indicate the roll for three respective aircraft represented by icons 330a, 330b, and 330c. The status indicators 320a, 320b, 320c may include roll scales 340a, 340b, 340c to further depict the detected roll with reference to a roll reference position indicated by a tick mark 350 on one or more of the scales.

A second display 304 includes second status indicator 322 for the yaw of each aircraft in formation. Status indicators 322a, 322b, and 322c indicate the yaw for the three respective aircraft represented by icons 332a, 332b, and 332c. The status indicators 322a, 322b, and 322c may include center lines 342a, 342b, and 342c to further depict the detected yaw angle.

The above-generated attention values for the roll and the yaw may be outputted to respective displays 302, 304. For example, a roll attention value 321 equal to 60% may be displayed on display 302, and a yaw attention value 323 equal to 40% may be displayed on display 304. These attention values 321, 323 indicate that an air traffic controller should devote 60% of the time attending to the roll display 302, and 40% of the time attending to the yaw display 304. The attention values 321, 323 may refer to proportion of a total time t devoted to roll and yaw displays 302, 304. In turn, time t represents a proportion of the air traffic controller's full time spent on the entire system, including other air traffic controller tasks, such as pilot communications, scheduling, etc.

In one embodiment, displays 302 and 304 may be displayed simultaneously, either in two separate displays, for example, two separate liquid crystal displays (LCD), or two separate display areas of a single LCD. In another embodiment, the air traffic controller can switch between displays 302 and 304 on a single LCD using, for example, a button to alternate between displays 302 and 304. Further, in another embodiment, the roll and yaw attention values may be predetermined and outputted prior to operation of the air traffic control system. In this embodiment, the air traffic controller uses the predetermined attention values to orient his attention to the displays 302, 304. In still another embodiment, the attention values may be recomputed based on dynamics inputs from, for example, weather sensors, communications systems, and other data input systems.

The attention values may be generated based on a context of the control system. A context is an operational scenario of the control system. For the above-mentioned automobile control system, for example, the context may be related to specific driving environments, such as driving on highways, city streets, or country roads. In these particular environments, the attention values may be computed based on a current situation, for example, when a driver drives his automobile in the left-lane of a two-lane divided highway, no automobiles traveling in the same direction will be on the left of the automobile. Instead, automobiles will be toward the front, right, and/or rear of the automobile. In such a situation, the attention value associated with an area to the left of the automobile may be 0%, while attention values associated with areas to the front, right, and rear of the automobile will be split based on various factors, such as nearby automobiles.

In another example involving the above-mentioned air traffic control system, the attention values may be weighted based on the context, such as current wind conditions. For example, strong winds from a particular direction may affect the status indicators differently. The system can adjust the attention values accordingly, for example, by applying a weighting factor to the status indicators based on disparate wind influences.

Figure 4:
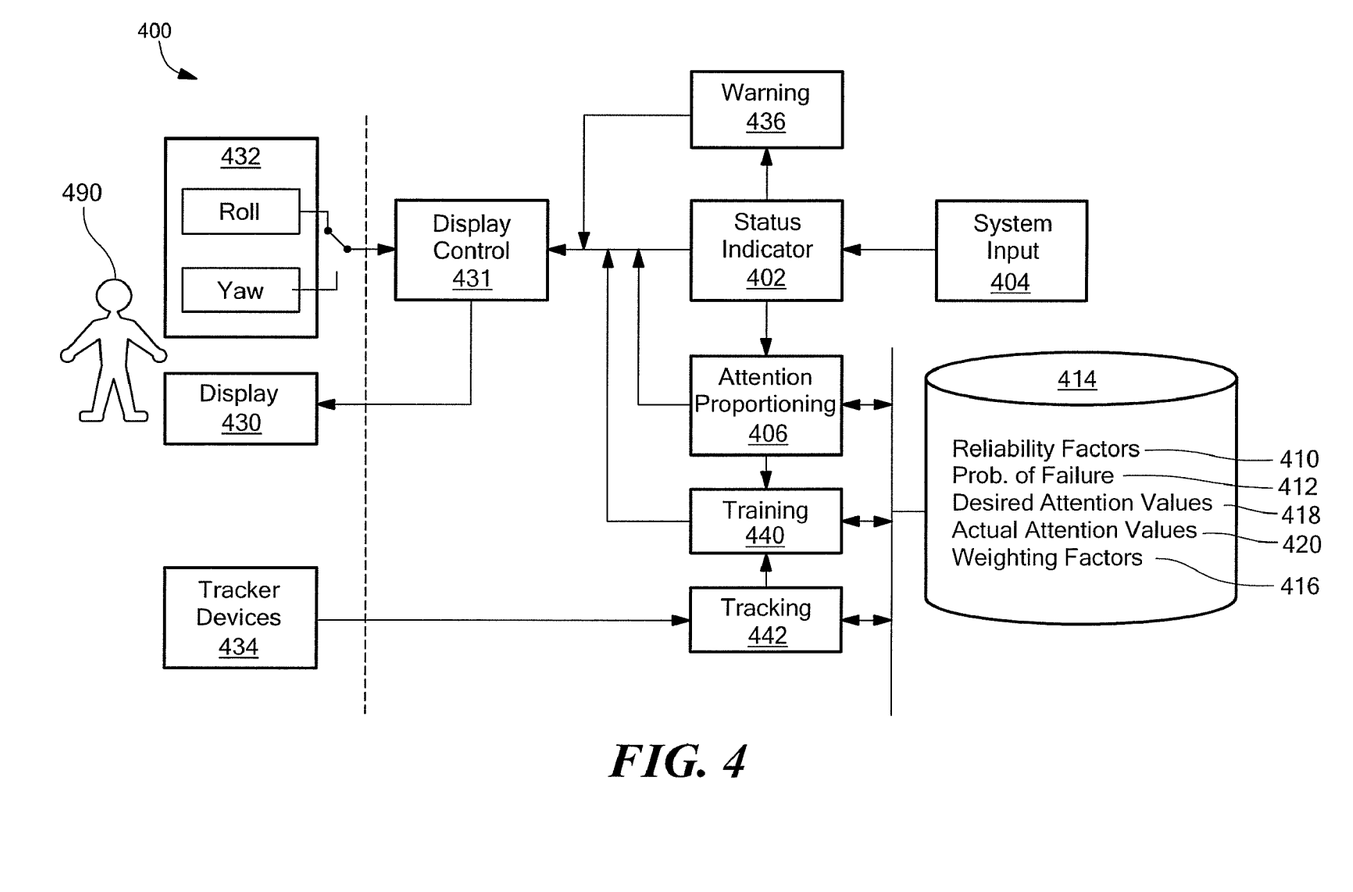
FIG. 4 is a block diagram of the air traffic control system in FIG. 2.

Referring now to FIG. 4, a control system incorporating the inventive concepts described herein includes a status indicator module 402 for generating one or more status indicators. The status indicator module 402 may be coupled to a system input module 404 for collecting information from external sources used to generate the status indicators. Such information may include sensor data, for example, water line pressure and temperature. The status indicator module 402 is coupled to an attention apportioning module 406 used to generate attention values for the status indicators. The attention apportioning module 406 uses the status indicators and other information such as status indicator reliability factors 410 and probability of control system failure 412 stored in, for example, a database 414. In another embodiment, these values are stored in a file saved in a memory.

The attention apportioning module 406 may be further coupled to the system input module 404 to generate attention values based on, for example, real-time sensor data, and an operational context of the control system. The attention proportion module 406 may also use the operational context to adjust the attention values based on stored weighting factors 416.

The attention apportioning module 406 may pass the generated attention values to a display 430 to output and display the generated attention values. In a further embodiment, the status indicator module 402 may pass the status indicators to the display 430 to output and display the status indicators. A control system user 490 may select which of the attention values and/or status indicators to display using an input device 432 to control a display controller 431 to switch between the values.

The control system 400 may also include a training mode 440 to train the user 490 to apportion attention based on the generated and displayed attention values. The control system 490 may include tracker devices to track the actual amount of attention the control system user 490 devotes to each of the attention values. For example, a head-mounted tracker may determine the amount of time the control system user 490 actually views each of the attention values. The tracking devices 434 may be coupled to a tracking module 442 to collect the actual attention values 420. The tracking module 442 may save the actual attention values 420 in the database 414.

The training module 440 can compare the actual attention values 420 to desired attention values 418, which are equal to the generated attention values. For example, the training module 440 can calculate the difference between actual attention values 420 and desired attention values 418, and pass the differences to the display 430. In this way, the control system user 490 can view and correct his attention behavior to come as close as possible to the desired attention values 418. In a further embodiment, the training module 440 can warn the control system user 490 when the differences between the actual attention values 420 and desired attention values 418 reach a threshold. For example, if the values are off by 15%, then the training module 440 can post a warning to the display 430.

In a further embodiment, a warning module 436 monitors the status indicators and passes a signal to output and display a warning to the display 430. Here, a warning means that one or more of the status indicators has a reached a value they may be a precondition for a control system failure. For example, the warning module 436 may monitor the roll of aircraft in formation, and if one of the aircraft reaches a threshold roll, the warning module 436 can send a command to the display 430 to post a warning. The threshold roll value may be a predetermined value that indicates a likelihood of control system failure. For example, the threshold roll value may indicate that a control system failure has more likely than not occurred when one or more of the aircraft has reached the threshold roll value, based on, for example, a statistical model or reliability data. Here, more likely than not means an over 50% chance of actual control system failure. The threshold roll value may be based on more stringent values indicating that, for example, a control system failure has likely occurred, i.e., an over 70% chance of actual control system failure.

The display 430 can display a warning cue for the roll, for example, a red box around the affected aircraft displayed on display 430. It will be apparent that many different methods may be used to display warnings, such as changing a color of the displayed status indicator, flashing a warning box around the status indicator, and/or sounding alerts.

Figure 5:
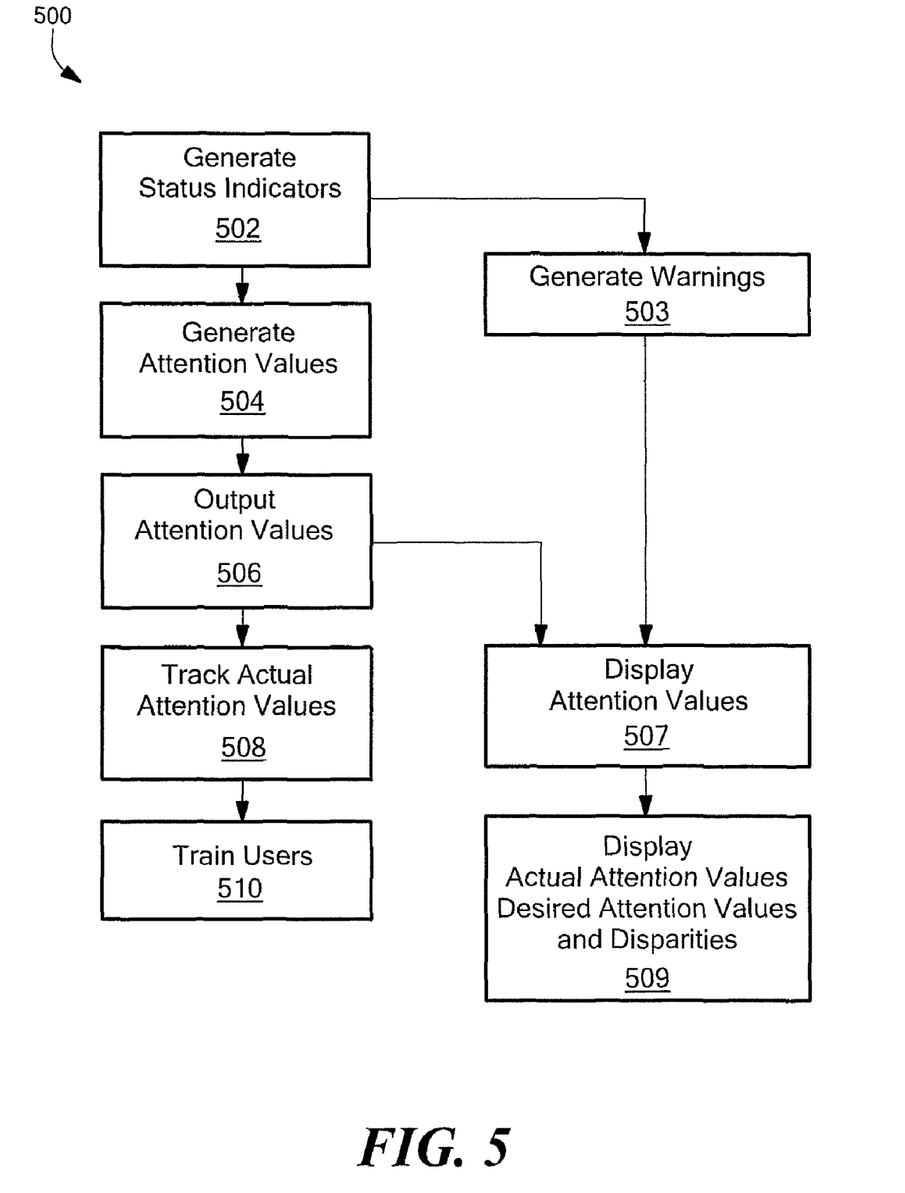
FIG. 5 is a flow diagram of an exemplary method for practicing the inventive systems, techniques, and concepts.

Referring now to FIG. 5, an exemplary method 500 for practicing the inventive systems, techniques, and concepts described herein includes generating status indicators 502 for a control system, generating attention values 504 indicating an amount of attention a user should devote to each of the status indicators, and outputting the attention values 506. The method 500 may further include displaying the attention values 507, for example, on a display. Along with the attention values, the method 500 may further display the status indicators and generated warnings 503 for each of the status indicators.

In a further embodiment, the method may track actual attention values 508 a user devotes to each of the status indicators in order to train the user 510 and/or correct the user's attention behavior. For example, the method 500 may compare the actual attention values obtained via tracking devices to track the user's attention with the desired attention values and display any disparities 509 to the user.

Figure 6:
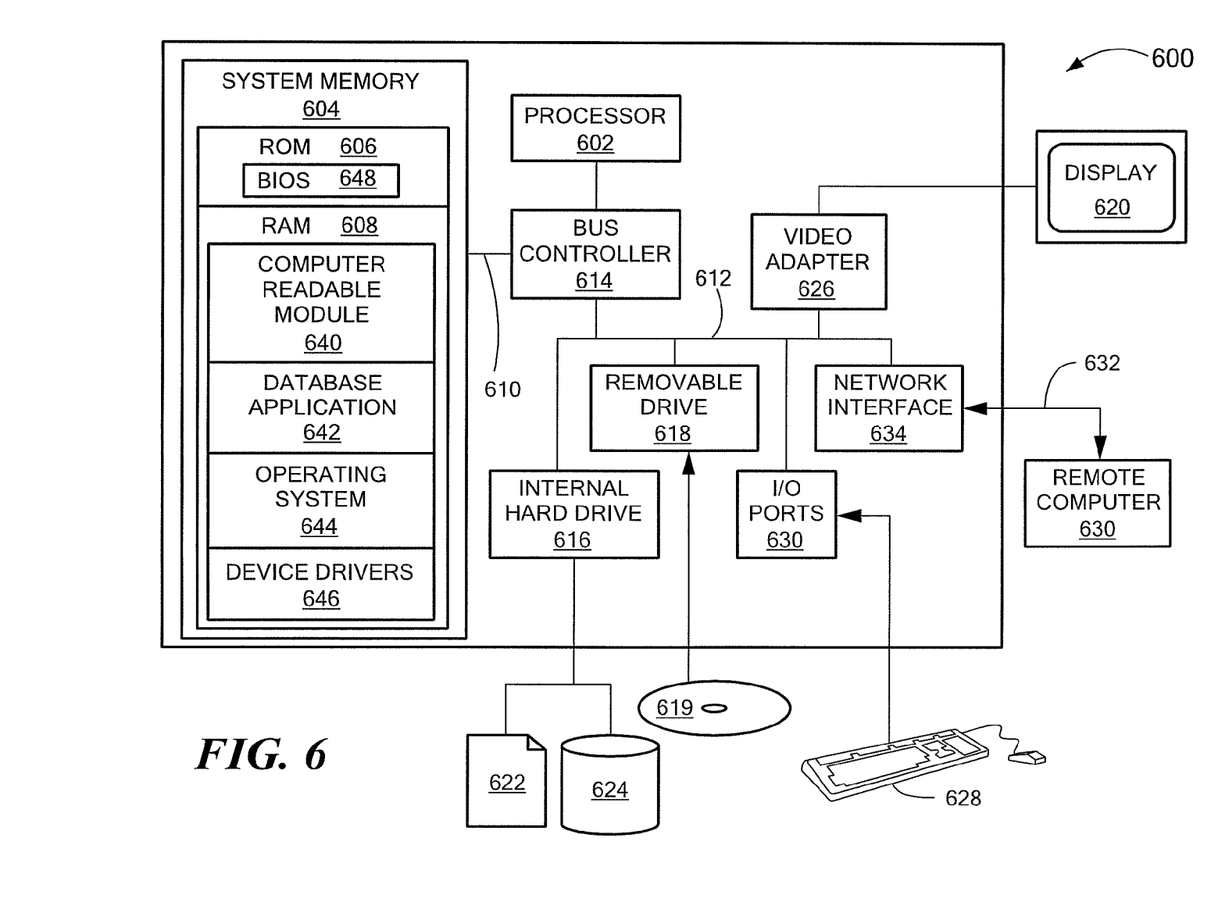
FIG. 6 is a diagram showing an exemplary hardware and operating environment of a suitable computer for use with embodiments of the invention.

FIG. 6 illustrates a computer 600 suitable for supporting the operation of an embodiment of the inventive systems, concepts, and techniques described herein. The computer 600 includes a processor 602, for example, a dual-core processor, such as the AMD Athlon™ X2 Dual Core processor from the Advanced Micro Devices Corporation. However, it should be understood that the computer 600 may use other microprocessors. Computer 600 can represent any server, personal computer, laptop, or even a battery-powered mobile device such as a hand-held personal computer, personal digital assistant, or smart phone.

Computer 600 includes a system memory 604 which is connected to the processor 602 by a system data/address bus 610. System memory 604 includes a read-only memory (ROM) 606 and random access memory (RAM) 608. The ROM 606 represents and device that is primarily read-only including electrically erasable programmable read-only memory (EEPROM), flash memory, etc. RAM 108 represents any random access memory such as synchronous dynamic random access memory (SDRAM). The Basic Input/Output System (BIOS) 648 for the computer 600 is stored in ROM 606 and loaded into RAM 608 upon booting.

Within the computer 600, input/output (I/O) bus 612 is connected to the data/address bus 610 via a bus controller 614. In one embodiment, the I/O bus 612 is implemented as a Peripheral Component Interconnect (PCI) bus. The bus controller 614 examines all signals from the processor 602 to route signals to the appropriate bus. Signals between processor 602 and the system memory 604 are passed through the bus controller 614. However, signals from the processor 602 intended for devices other than system memory 604 are routed to the I/O bus 612.

Various devices are connected to the I/O bus 612 including internal hard drive 616 and removable storage drive 618 such as a CD-ROM drive used to read a compact disk 619 or a floppy drive used to read a floppy disk. The internal hard drive 616 is used to store data, such as in a file 622 and a database 624. Database 624 includes a structured collection of data, such as a relational database. A display 620, such as a cathode ray tube (CRT), liquid-crystal display (LCD), etc. is connected to the I/O bus 612 via a video adapter 626.

A user enters commands and information into the computer 600 by using input devices 628, such as a keyboard and a mouse, which are connected to I/O bus 612 via I/O ports 630. Other types of pointing devices that may be used include track balls, joy sticks, and tracking devices suitable for positioning a cursor on a display screen of the display 620.

Computer 600 may include a network interface 634 to connect to a remote computer 630, an intranet, or the Internet via network 632. The network 632 may be a local area network or any other suitable communications network.

Computer-readable modules and applications 640 and other data are typically stored on memory storage devices, which may include the internal hard drive 616 or the compact disk 619, and are copied to the RAM 608 from the memory storage devices. In one embodiment, computer-readable modules and applications 640 are stored in ROM 606 and copied to RAM 608 for execution, or are directly executed from ROM 606. In still another embodiment, the computer-readable modules and applications 640 are stored on external storage devices, for example, a hard drive of an external server computer, and delivered electronically from the external storage devices via network 632.

The computer 600 may execute a database application 642, such as Oracle™ database from Oracle Corporation, to model, organize, and query data stored in database 624. The data may be used by the computer-readable modules and applications 640 and/or passed over the network 632 to the remote computer 630 and other systems.

In general, the operating system 644 executes computer-readable modules and applications 640 and carries out instructions issued by the user. For example, when the user wants to execute a computer-readable module 640, the operating system 644 interprets the instruction and causes the processor 602 to load the computer-readable module 640 into RAM 608 from memory storage devices. Once the computer-readable module 640 is loaded into RAM 608, it can be used by the processor 602 to carry out various instructions. The processor 602 may also load portions of the computer-readable modules or applications 640 into RAM 608 as needed. The operating system 644 uses device drivers 646 to interface with various devices, including memory storage devices, such as hard drive 616 and removable storage drive 618, network interface 634, I/O ports 630, video adapter 626, and printers.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. An article comprising:
a non-transitory storage medium having stored instructions that when executed by a machine result in the following:
generating a first status indicator and a second status indicator;
generating a first attention value to indicate an amount of attention a user should devote to the first status indicator, and a second attention value to indicate an amount of attention the user should devote to the second status indicator; and
outputting the first and second attention values to enable display for the user,
wherein each of the status indicators is associated with a reliability factor and a probability of failure and said generating the attention values is based on a function of the reliability factor and the probability of failure.

2. The article according to claim 1, wherein outputting the first and second attention values comprises displaying the first attention value on a first display and displaying the second attention value on a second display.

3. The article according to claim 1, further comprising:
generating a first actual attention value representing the actual attention the user devotes to the first status indicator, and a second actual attention value representing the actual attention the user devotes to the second status indicator;
generating a first difference value representing the difference between the first attention value and the first actual attention value for the first status indicator, and a second difference value representing the difference between the second attention value and the second actual attention value for the second status indicator; and
outputting the first and second actual attention values and the first and second difference values to enable display to a user.

4. The article according to claim 1, wherein the first status indicator comprises a plurality of status indicators, and the first attention value comprises a plurality of attention values to indicate an amount of attention the user should devote to the plurality of status indicators.

5. A method comprising:
generating, by a computer processor, a first status indicator and a second status indicator;
generating a first attention value to indicate an amount of attention a user should devote to the first status indicator, and a second attention value to indicate an amount of attention the user should devote to the second status indicator; and
outputting the first and second attention values to enable display for the user,
wherein each of the status indicators is associated with a reliability factor and a probability of failure and said generating the attention values is based on a function of the reliability factor and the probability of failure.

6. The method of claim 5, wherein outputting the first and second attention values comprises displaying the first attention value on a first display and displaying the second attention value on a second display.

7. The method of claim 5, further comprising:
generating a first actual attention value representing the actual attention the user devotes to the first status indicator, and a second actual attention value representing the actual attention the user devotes to the second status indicator;
generating a first difference value representing the difference between the first attention value and the first actual attention value for the first status indicator, and a second difference value representing the difference between the second attention value and the second actual attention value for the second status indicator; and
outputting the first and second actual attention values and the first and second difference values to enable display to a user.

8. The method of claim 5, wherein the first status indicator comprises a plurality of status indicators, and the first attention value comprises a plurality of attention values to indicate an amount of attention the user should devote to the plurality of status indicators.

9. A system, comprising:
a status indicator module executing in a microprocessor to generate a first status indicator and a second status indicator;
an attention apportioning module to generate a first attention value indicating an amount of attention a user should devote to the first status indicator, and a second attention value indicating an amount of attention the user should devote to the second status indicator; and an output module to output the first and second attention values to enable display for the user, wherein each of the status indicators is associated with a reliability factor and a probability of failure and the attention apportioning module generates the attention values based on a function of the reliability factor and the probability of failure.

10. The system of claim 9, wherein the first attention value is displayed on a first display and the second attention value is displayed on a second display.

11. The system of claim 9, further comprising:
a tracker module to generate a first actual attention value representing the actual attention the user devotes to the first status indicator, and a second actual attention value representing the actual attention the user devotes to the second status indicator; and
a training module to generate a first difference value representing the difference between the first attention value and the first actual attention value for the first status indicator, and a second difference value representing the difference between the second attention value and the second actual attention value for the second status indicator,
wherein the output module further outputs the first and second actual attention values and the first and second difference values to enable display to the user.

12. The system of claim 9, wherein the first status indicator comprises a plurality of status indicators, and the first attention value comprises a plurality of attention values to indicate an amount of attention the user should devote to the plurality of status indicators.

13. The article of claim 1, wherein the first status indicator and the second status indicator are associated with an automation control system.

14. The article of claim 1, further comprising a total attention value equal to a sum of the first attention value and the second attention value, the total attention value representative of a total amount of attention the user should devote to the first status indicator and the second status indicator.

15. The article of claim 14, wherein a sum of the total attention value and an attention value of at least one other status indicator is representative of the full attention of the user with respect to a task.

16. The method of claim 5, wherein the first status indicator and the second status indicator are associated with an automation control system.

17. The method of claim 5, further comprising:
generating a total attention value equal to a sum of the first attention value and the second attention value, the total attention value representative of a total amount of attention the user should devote to the first status indicator and the second status indicator.

18. The method of claim 17, further comprising:
generating a sum of the total attention value and an attention value of at least one other status indicator, the sum representative of the full attention of the user with respect to a task.

19. The system of claim 9, wherein the first status indicator and the second status indicator are associated with an automation control system.

20. The system of claim 9, further comprising a total attention value equal to a sum of the first attention value and the second attention value, the total attention value representative of a total amount of attention the user should devote to the first status indicator and the second status indicator.

21. The system of claim 20, wherein a sum of the total attention value and an attention value of at least one other status indicator is representative of the full attention of the user with respect to at least one task.

* * * * *